Patented Dec. 26, 1933

1,941,280

UNITED STATES PATENT OFFICE 1,941,280

FRICTION MATERIAL AND METHOD OF MAKING THE SAME

Mark Shoeld, Pittsburgh, Pa.

No Drawing. Application October 6, 1928
Serial No. 310,913

17 Claims. (Cl. 18—47.5)

My invention relates to friction materials and methods of making the same and particularly to such materials as may be employed for friction facings or brake linings for automobiles and similar vehicles.

An object of my invention is to provide molded friction material of improved qualities and of definite frictional characteristics.

A further object of my invention is to provide an improved process for the manufacture of molded friction material by means of which the frictional characteristics may be predetermined.

Friction facings or brake linings have ordinarily been made from wire-inserted asbestos yarn that has been either woven into a tape and impregnated with a compound or woven into a cloth, rubberized and then folded and vulcanized. Such material has, in general, not proved satisfactory because in case excessive temperatures are developed by reason of unduly severe application of the brakes for comparatively long periods part or all of the impregnating compound may be decomposed and the frictional characteristics of the material are greatly changed. Under such circumstances, however, the wire-inserted yarn will prevent the distintegration of the brake lining.

Molded compositions have been made by bonding asbestos fiber with hard rubber or other organic compounds under high heat and pressure. In this material, the bonding compound must be of such nature that it does not soften or disintegrate under the most extreme temperatures encountered in actual operating conditions.

A disadvantage of the type of friction material is that the bonding compound that is necessarily employed is not a suitable compound for producing the most desirable characteristics of wear and coefficient of friction. Also, in case soft steel drums are used, undesirable scoring results and the brakes are thereby caused to become noisy or squeaky.

In accordance with the present invention, I have found that it is possible to produce a molded friction material which possesses all of the desirable characteristics of the woven or folded and stitched type. In addition, the employment of my process makes it possible to use relatively inexpensive short-fiber asbestos and the relatively expensive operations of carding, spinning and weaving are omitted. In general, the molded friction material of my invention is initially of porous character, bonded together with a substantially infusible bonding compound that is impregnated with a suitable compound to produce the desired characteristics with respect to coefficient of friction and wear. When the material is completed, it is superior to those described above by reason of the coefficient of friction and its constancy during the use of the material.

A preferred method of producing my improved friction material comprises the preparation of a short-fiber paper stock asbestos by pulping the latter with water. Gilsonite, hard pitch or other suitable material that is capable of being easily polymerized to a substantially infusible substance is ground in water to a slurry. A third slurry is formed by grinding sulphur in water. These three slurries are now mixed in desired proportions which may be, for example, as follows:

| | Parts |
|---|---|
| Asbestos fiber | 100 |
| Gilsonite or hard pitch | 30 |
| Sulphur | 15 |

The combined solutions are thoroughly mixed and the resulting pulp is next introduced on a suction filter. The length and the width of the filter should be approximately equal to, or slightly smaller than, the corresponding dimensions of the desired finished product. For example, in case the friction material is intended for use in connection with a drum brake, the length of the friction element should be about ⅕ or ⅙ of the circumference of the drum. The excess water in the pulp is next removed by the application of suction to the filter.

The felted moist sheet is then transferred to a mold of desirable shape where the material is subjected to sufficient pressure to cause it to assume the shape of the mold. A suitable pressure is, for example, from one-half to five tons per square inch. The molded material is next removed from the mold, dried, and then heated to a temperature which will change the bonding compound to a substantially infusible material.

If the material is heated in the presence of air, a temperature of 500 to 550° F. for a period of about one hour will be sufficient to polymerize the bonding material and to render it substantially infusible. If the heating occurs in an atmosphere of non-combustible gas, such as flue gases that may be employed for heating, the temperature may be materially higher. At the end of the heating operation, the friction element has become a porous and substantially rigid and infusible member.

The heating chamber that is used in the manner described above is preferably constructed for use, also, as an impregnating apparatus. For the latter purpose, it is desirable that it be arranged for the production of a vacuum therein. When the vacuum has been established in the heating chamber, an impregnating compound which has been previously heated to a temperature of 600 to 700° F. is introduced into the vacuum chamber. The impregnating compound, which may, for example, be a blown petroleum, asphalt or a mixture of this material with Gilsonite, has a melting point of substantially 200 to 250° F. The viscosity of the impregnating compound at the temperature to which it has been heated should be low enough to easily penetrate all of the pores of the friction element.

When the vacuum chamber has been filled to a desired level with the impregnating compound, pressure of about 100 pounds per square inch is applied thereto to insure thorough saturation of the friction elements. The pressure is reduced after ten to fifteen minutes, sufficient pressure remaining to discharge the excess impregnating compound back to the tank in which it is heated and stored. After impregnation, the friction elements are allowed to drain and cool slowly and are then finished and ready for use.

Obviously, the composition of the impregnating compound may be varied in accordance with the frictional characteristics desired in the finished product. Waxes and resins may be added to the materials referred to above, as may be certain types of drying oil, such as linseed and tung oil. In case drying oils are added, a final baking operation will be of advantage in completing the process.

Instead of using sulphur for the purpose of rendering the bonding compound infusible by polymerization or removal of hydrogen from the hydrocarbons, I may substitute for such bonding compounds substances that polymerize under heat, such, for example, as phenolic resins or phenolic condensation products.

A modification of the process described above may also be employed for the production of friction material according to the same general principles as those of the process described above. In this process, a somewhat longer asbestos fiber may be used, as, for example, carded No. 2 crude or "A" fiber. When using the longer fiber, the felting operation is preferably dry, the asbestos being felted on a suction filter screen, as in the previous process. A water solution of sodium silicate is then poured over the felted asbestos and the excess solution is removed by suction applied to the filter.

The sodium silicate solution is preferably prepared by diluting commercial 40 Bé. grade $Na_2SiO_3$ with water to about 30 to 35 Bé. The moist felted sheet is then powdered with suitable material to prevent its sticking to the mold when it is inserted therein. Powdered pumice may be used for this purpose. After the material is in the mold, it is pressed in substantially the same manner as described in the previous process. The pressed friction element is then carefully removed from the mold and dried at a temperature of about 500° F. for a period of one hour. At the end of the drying operation, the friction element is sufficiently rigid that it will retain its shape through the various subsequent operations.

The friction material is next treated with a water solution of magnesium fluo-silicate. The reaction which occurs may be represented as follows $$Na_2SiO_3 + MgSiF_6 = Na_2SiF_6 + MgSiO_3.$$

Both of the salts produced by this reaction are water-insoluble. Other water-soluble salts or acids which produce a water-insoluble silicate or silica may be substituted for the magnesium fluo-silicate. Typical examples are $CaCl_2$, $MgCl_2$, HCl, etc. In the latter cases, however, a water-soluble by-product is produced and this by-product is preferably washed out of the material before the latter is dried. The washing operation is especially important if the water-soluble salt remaining in the material is of hygroscopic nature. A typical reaction in case one of the latter substances is used may be represented as follows:

$$Na_2SiO_3 + CaCl_2 = CaSiO_3 + 2NaCl.$$

After a friction element produced by any of the foregoing reactions has been dried at 500° F. for one hour, the resulting porous element is impregnated with an organic compound for the purpose of determining the coefficient of friction. The organic compound may, for example, be of a varnish base comprising asphaltite and linseed oil or of tung oil which may, if desired, be diluted with a solvent. The nature of the impregnating compound employed determines whether or not it is necessary to pass the friction elements through a final baking operation for the purpose of setting or fixing the impregnating compound.

The friction material produced by the processes described hereinabove possess numerous advantages in that it may be molded to desired shape for coacting with brake drums or the like and that it possesses the desired characteristics with respect to coefficient of friction and wear. These characteristics may be varied, as desired, in accordance with the service for which the material is to be adapted.

My improved brake lining possesses the advantage that in case the lining is subjected to excessively high temperatures and the impregnating compound is destroyed as by being volatilized or carbonized the lining may be again impregnated and the original frictional properties substantially entirely restored. This advantage is secured by reason of the fact that the impregnating compound exists as a separate or independent compound in the pores of the body of the lining which has been set or cured before impregnation.

While I have described my invention with respect to the employment of certain materials or ingredients and of specified amounts and the relative proportions of such ingredients, it is apparent that variations may be made therefrom without departing from the spirit of my invention. It will be apparent, also, that variations in the temperatures and pressures involved may occur in connection with the employment of various materials and that such variations are contemplated within the scope of my invention. Other changes may be suggested by those skilled in the art relating to the production of friction material. My invention is not to be limited except as expressed in the claims.

I claim as my invention:

1. Friction material comprising a refractory material, an infusible water-insoluble bonding material and an organic impregnating compound therefor that is not homogeneous therewith.

2. The method of producing friction material which comprises combining a refractory material with a bonding material that is rendered infusible and water-insoluble and then impregnating with an organic compound.

3. Molded friction material comprising a refractory material, an infusible water-insoluble bonding material and an impregnating compound for determining the frictional characteristics thereof, said impregnating compound not being homogeneous with said materials whereby it is renewable in case of its destruction.

4. The method of producing friction material which comprises combining a refractory material and a water-insoluble bonding material, molding the product, rendering said bonding material infusible, and then impregnating with an organic compound.

5. Friction material comprising comminuted asbestos, an infusible water-insoluble binder therefor and an organic impregnating compound that is not in composition therewith.

6. The method of producing friction material which comprises combining felted asbestos and a water-insoluble bonding material, molding the product into desired shape, drying and rendering said bonding material infusible and then impregnating said product with an organic compound.

7. The method of producing friction material which comprises combining felted asbestos and a bonding material that is infusible when heated to predetermined temperature, molding the product under pressure, rendering said bonding material infusible and water-insoluble by heating and then impregnating said product with an organic compound.

8. The method of producing friction material which comprises felting asbestos, reducing a polymerizable substance to a slurry, combining the products thus obtained, removing excess moisture therefrom, molding the material under pressure, heating the molded product to render the polymerizable substance infusible and then impregnating the resulting porous product with material for determining its frictional characteristics.

9. The method of producing molded friction material which comprises pulping asbestos with water, grinding a polymerizable substance to a slurry, mixing the products thus obtained, removing excess water from the mixture, molding the latter under pressure, heating the molded product to render the polymerizable substance infusible and then impregnating the porous material thus produced with a material for determining its frictional characteristics.

10. Friction material comprising a porous, rigid, infusible and water-insoluble product embodying asbestos, an inorganic bonding material and an organic impregnating compound.

11. The method of producing molded friction material which comprises preparing slurries of asbestos and water, bituminous substance and water, and sulphur and water, mixing said slurries, removing excess water from the mixture, molding the latter under pressure, heating the molded product to cause the sulphur to polymerize the bituminous substance to render it infusible and then impregnating the porous material thus obtained with a substance for determining its frictional characteristics.

12. The method of producing molded friction material which comprises separately preparing slurries of asbestos and water, a bituminous substance and water, and sulphur and water in the proportion of asbestos, 100 parts, bituminous substance, 30 parts, and sulphur, 15 parts, mixing said slurries, removing excess water from the mixture, molding the latter under pressure, heating the molded product to cause the sulphur to polymerize the bituminous substance to render it infusible and then impregnating the rigid porous material thus obtained with an organic compound.

13. The method of producing molded friction material which comprises felting asbestos, mixing the asbestos with a solution of sodium silicate, molding the moist material thus provided, drying the molded product reducing the sodium silicate to a water-insoluble silicate, drying the product and then impregnating the porous material thus obtained with a substance for determining its frictional characteristics.

14. The method of producing molded friction material which comprises felting asbestos, mixing the asbestos with a water-soluble silicate, molding the moist material thus provided, drying the molded product, treating the silicate with a water-soluble reagent to produce a water-insoluble product, drying the material and then impregnating it with an organic compound.

15. Friction material comprising a porous body portion of refractory material and rigid bonding material that is infusible and water-insoluble and an organic compound that impregnates said body portion and that may be replaced therein if removed therefrom.

16. Friction material comprising a porous base of infusible fibrous material having intimately incorporated therewith an infusible resinous binder, the whole being impregnated with an organic material having frictional properties and that is not homogeneous therewith.

17. Friction material comprising a porous, substantially rigid and infusible body portion containing refractory material and impregnated with an organc compound not in composition therewith and which occupies the pores thereof for determining its frictional characteristics whereby said compound may be renewed in case it is subjected to destructive temperature.

MARK SHOELD.